(12) United States Patent
Matteis

(10) Patent No.: US 12,523,501 B2
(45) Date of Patent: Jan. 13, 2026

(54) MULTITURN COUNTER USING MAGNETIC DOMAIN WALL CONDUCTORS WOUND IN THE MANNER OF CLOSED LOOPS

(71) Applicant: HORST SIEDLE GMBH & CO. KG, Furtwangen (DE)

(72) Inventor: Roland Matteis, Jena (DE)

(73) Assignee: HORST SIEDLE GMBH & CO. KG, Furtwangen (DE)

( * ) Notice: Subject to any disclaimer, the term of this patent is extended or adjusted under 35 U.S.C. 154(b) by 43 days.

(21) Appl. No.: 18/293,602

(22) PCT Filed: Jun. 24, 2022

(86) PCT No.: PCT/DE2022/000077
§ 371 (c)(1),
(2) Date: Jan. 30, 2024

(87) PCT Pub. No.: WO2023/016593
PCT Pub. Date: Feb. 16, 2023

(65) Prior Publication Data
US 2024/0337510 A1    Oct. 10, 2024

(30) Foreign Application Priority Data

Aug. 12, 2021 (DE) ..................... 10 2021 004 187.9

(51) Int. Cl.
*G01D 5/00* (2006.01)
*G01D 5/20* (2006.01)
(52) U.S. Cl.
CPC ....... *G01D 5/2046* (2013.01); *G01D 2205/26* (2021.05)
(58) Field of Classification Search
CPC ........ G01D 5/16; G01D 5/145; G01D 5/2046; G01D 2205/26; G01R 33/09; G01R 33/098; G11C 19/0808
See application file for complete search history.

(56) References Cited

U.S. PATENT DOCUMENTS 10,228,267 B2    3/2019 Mattheis et al.
10,962,386 B2 *  3/2021 Mattheis ............ G01D 5/24476
(Continued)

FOREIGN PATENT DOCUMENTS

DE    102010022611 B4    2/2015
DE    102013018680 A1    5/2015
DE    102017005562 A1    1/2018

OTHER PUBLICATIONS

Hodges, M. P. P., et al.; "Suppression of stochastic pinning in magnetic nanowire devices using "virtual" domain walls", Journal of Applied Physics, vol. 116, No. 12, Sep. 28, 2014 (Sep. 28, 2014), 123917-1-123917-6.

*Primary Examiner* — Tuan T Lam
(74) *Attorney, Agent, or Firm* — Norris McLaughlin, P.A.

(57) ABSTRACT

In a revolution counter using magnetic domain wall conductors which are wound each as a loop in a form of a spiral configured to be closed, in the connecting region the inner and outer loop section ends of the loop of a first magnetic domain wall conductor are combined and bridged by a second magnetic domain wall conductor which is connected to the magnetic domain wall conductor ends of the spiral with a respective gap therebetween, wherein the gap creates a local interruption of the domain wall conductor, and wherein the mean width of the gap is set to be smaller than the thickness of the domain wall conductors, and the adjoining domain conductor sections are encompassed by a non-magnetic layer in the gap region.

8 Claims, 5 Drawing Sheets

(56) References Cited

U.S. PATENT DOCUMENTS

| | | | |
|---|---|---|---|
| 2005/0237054 A1 | 10/2005 | Halder et al. | |
| 2010/0301842 A1* | 12/2010 | Mattheis | G11C 19/0808 |
| | | | 324/207.25 |
| 2016/0265941 A1 | 9/2016 | Mattheis et al. | |
| 2023/0384399 A1* | 11/2023 | Matteis | G01R 33/093 |

* cited by examiner

MULTITURN COUNTER USING MAGNETIC DOMAIN WALL CONDUCTORS WOUND IN THE MANNER OF CLOSED LOOPS

The invention relates to revolution counters using magnetic domain wall conductors which are designed to be closed and wound in a loop-like manner, and which are, in particular, to be used for revolution counters for higher revolutions U (U>100).

Magnetic sensors can detect properties of a magnetic field, such as the field direction thereof. One example is an angle sensor. Other types of magnetic sensors can determine how often a magnetic field has rotated. Such revolution counters can be made, for example, with a GMR revolution counter or a TMR revolution counter, as they are sufficiently known in the related art (for example: RSM-2800: https://www.novotechnik.de/fileadmin/user_upload/pdfs/kataloge_flyer/Flyer_RSM-2800.pdf). The basic principle of such magnetic revolution counters is based on the use of magnetic domain walls moving in continuous magnetic regions that can be regarded as magnetic conductors. These are made of soft magnetic metallic materials. The read-out principle uses magnetoresistive effects. For this purpose, further magnetic and non-magnetic layers are necessary, at least locally, which allow the magnetic domain walls to be localized. Revolution counters have been technologically implemented, in which, in an electrically and magnetically continuous magnetic conductor, which itself is an integral part of a GMR stack or forms a TMR stack locally, magnetic domain walls, generated based on magnetic fields acting from the outside, for example due to rotating permanent magnets, move within a spirally disposed magnetic conductor. The length of the magnetic conductor increases disproportionately in relation to the number N of windings of which the spiral is composed since the length of each individual winding increases to the outside. If the length of the innermost loop $L_1$ and the distance between the individual windings is a, the length $L_i$ of the ith winding of a spiral composed of N windings results as follows from the following formula: length $(L(i)=L_1+8(i-1)\cdot a$. The total length L(N) of a spiral having N windings thus results as the sum of the individual lengths $L_i$ as $L(N)=N\cdot L_1+4\cdot a\cdot(N^2-N)$. This length L(N) thus increases with N in a greater than linear manner.

As the length of the continuous magnetic conductor grows, there is a proportional increase in the likelihood that a defect will be present in the conductor, which will impair the movement of the magnetic domain walls, such that the conductor no longer fulfills the function thereof. Thus, the yield decreases disproportionately as N increases. At the same time, the required chip surface becomes increasingly larger with increases in N, especially due to the number of contact points required for the read-out, the number of which increases directly proportionally with N. These properties practically limit the use of a spiral that is not closed for the implementation of a revolution counter to N<=64. There are many requirements in technologies, for which considerably more than 64 revolutions must be counted, which cannot be achieved by the basic principle described above.

As is proposed in DE 10 2013 018 680 A1, counting of revolutions can also be implemented so that, in contrast to the use of a single open spiral, several closed loops $CL_i$ (CL=closed loops) are used, wherein the ith loop is composed of a spiral having $N_i$ windings. In all spirals $N_i$, the outer and inner ends are in each case connected to one another, and thus each form a closed loop $CL_i$. In addition, the loops $N_i$, with i=1 to 4, according to patent DE 10 2013 018 680 A1, are each designed to in a coprime manner relative to one another. This allows a revolution counter designed in this way to count from 1 to $N_1 \cdot N_2 \cdot \ldots N_n$. In an exemplary case, for n=four loops with $N_i$=5; 7; 9 and 13, this means that up to 4095 revolutions can be ascertained. The total length of all closed loops corresponds to a single spiral where N=34, according to the solution above described.

Thus, it is apparent that, due to the considerably smaller total number of individual loops, the total length of all loops can also be designed to be much shorter in each of the loops $CL_i$. At the same time, this means that the total length of the magnetic conductor, which determines the yield, is considerably shorter for such an implementation of a revolution counter. This suggestion also reduces the number of terminal pads required for reading out the respective revolution information. This, furthermore, allows this revolution counter to be kept smaller in terms of the surface area, and to thus be produced more cost-efficiently. To implement the closed loops $CL_i$, the inner and outer ends of all loops $CL_i$ must each be connected to one another. There are two approaches described in the prior art. DE 10 2013 018 680 A1 provides for implementing the connection by introducing a new functional element, namely an intersection within the magnetic conductor, as is shown in FIG. 1.

For this solution, the entire revolution sensor is situated in one plane. This solution has the advantage that the intersection can also be produced using the same technological approach by which the spiral is created. The disadvantage of this solution, however, is that the width of the magnetic conductor in the region of the intersection increases to at least 1.414 times the value (diagonal D of the two tracks having the width w which form the intersecting region in FIG. 1), and thus takes on a value range from w to $D_{exp}$ within the structure. Important properties of the sensor, namely the field range in which the sensor is able to count error-free, are thus directly linked to the geometry. There is a minimum range $B_{min}$ for error-free functionality, which must be met in order to transport the domain walls securely in the domain wall conductors at all times. Likewise, a field $B_{max}$ must not be exceeded, since otherwise further domain walls arise within the structure in an uncontrolled manner. Since the values for $B_{min}$ and $B_{max}$ are inversely proportional to the width W, this results in a local decrease of the values for the minimum induction $B_{min}$ and the maximum induction $B_{max}$, at which the revolution sensor can be operated, at the intersection, where the width value is increased by a factor of 1.42. This is illustrated in FIG. 2. The figure shows the manner in which the size of a magnetic window $\Delta B$ is a function of a strip width w. For a spiral having a strip width w=350 nm, the magnetic window $\Delta B$ is demarked by the dotted double line in FIG. 2. If w increases to 525 nm, the magnetic window $\Delta B$ is characterized by the perpendicular double dotted line. Since structures in which w=350 nm and in which w=525 nm are present in the spiral having an intersection, the magnetic window $\Delta B$, as plotted in FIG. 2, results from the vertical distance between the two parallel horizontal lines. From this, it follows that a revolution sensor having an intersection can only be operated within the considerably narrower $\Delta B$ region, which is results from the smaller value of $B_{max}$ as well as the larger value of $B_{min}$ of the two substructures, shown in FIG. 2.

The difference between $B_{min}$ and $B_{max}$ represents the width of the magnetic window in which the revolution counter can be utilized. In the case shown in FIG. 2, the magnetic window $\Delta B$ would be reduced from a width of 15 mT (an open spiral with b=350 nm) to a width of just under 5 mT if an intersection having a diagonal D of 525 nm were successfully implemented. The magnetic window, as shown in FIG. 2 by way of the rectangle, would then be delimited by the $B_{max}$ value for D=w=525 nm and the $B_{min}$ value for w=350 nm, and would be lowered from 15 mT to the value of 5 mT compared to the spiral without an intersection. As shown in FIG. 1, with the known implemented loops, the geometry of the intersection (see FIG. 1, circle A2) deviates from the ideal geometry (circle A1). Due to the rounding at the intersections, the value of D increases. With the greater value $D_{exp}$ compared to the value D of the ideal intersection, the experimentally achievable magnetic window, which has a size of 1-2 mT, is even smaller than that which would be expected according to FIG. 2, at 5 mT, and is therefore completely unsuitable for a practical application. For application reasons, the magnetic window should be as large as possible since this window is the decisive factor of the level of immunity to interference fields that the sensor has. A narrow magnetic window necessitates major additional technological effort to suppress impermissible magnetic interference fields, which is not described in greater detail here, and thus causes high costs and larger designs for the sensor system. Furthermore, a narrow magnetic window requires narrow tolerances during the production of the revolution counter, with respect to the installation position, and also narrow tolerances for the magnet 12 generating the rotating field, as is shown in FIG. 3 for a possible application, which in turn results in increasing costs.

An intersection-free closed loop structure was also proposed in the patent DE 10 2010 022 611 B4. This solution requires the short circuit of the spiral, which is to say, the connection of the inner end to the outer end of the spiral by a magnetic conductor, to be designed so that no intersection arises. This can only be implemented by implementing this connection in a plane E2 above or beneath the plane E1, in which the spiral that is not closed is situated (see FIGS. 4 and 5). When, in the ideal case, the width of the magnetic conductor is constant throughout, this version of the revolution counter having closed loops would have a magnetic window that has the same width as the spiral, and a considerably wider magnetic window would therefore result than is possible in general by way of the intersection variant described above. However, no known technical implementation of the latter solution exists to date. This is due to the fact that this solution presupposes that the still open spiral produced in plane 1, as is shown in a top view in FIG. 4 and in a cross-sectional view in FIG. 5, must be provided with an additional magnetic conductor M2 extending from plane 1 over plane 2 and back into plane 1, which connects the two ends of the open spiral situated in plane 1 to one another at the identified points K1 and K2.

The thickness of the layer structure (the domain wall conductor) responsible for the movement of the magnetic domain walls is t. The cross-section on the left in FIG. 5 shows that the connecting region marked as M2 is partially situated in a plane E2 above or, in a solution that is likewise possible, beneath plane E1, in which the spiral to be traversed is situated, and consequently does not make contact therewith. The two structures only meet in a shared plane E1 at the points K1 and K2, at which M2 meets M1.

The challenge of this approach is that, ideally, the short circuit must be designed so that the cross-section of the magnetic conductor M2 forming the short circuit is identical to the cross-section of the magnetic conductor M1 of the spiral. From a manufacturing point of view, this could actually be implemented relatively easily. The especially critical aspect with this approach is the point at which the magnetic conductor M1 and the magnetic conductor M2 meet. This must take place essentially without offset, laterally and vertically, since it was found that even displacements transverse to the strip in the range of 15 nm strongly promote retention (pinning) of the moving magnetic domain walls, and would thus increase the value of the lower magnetic window $B_{min}$ shown in FIG. 2. The lateral offset thus must be less than ¹⁄₂₀ of the width of the magnetic conductor for example, so as not to notably worsen the lower magnetic window, the width for the previously used sensors being approximately 350 nm. Still more critical is the requirement that the thickness, at the point at which the two conductors M2 and M1 directly abut one another, may also deviate only minimally from the thickness of the conductor sections M1 and M2 adjoining one another, so as to obtain a continuous magnetic conductor that has the same properties, which are decisive for the sensor function, for the creation of the magnetic domain walls, as well as the movement thereof through the magnetic conductor, across the entire length. This requirement, however, excludes a conceivable overlap at the connecting point, as it is shown in the enlarged circle A6 in FIG. 5.

FIGS. 1 to 5 represent solutions according to the known prior art and the problems that arise as a result.

It is the object of the invention to provide a revolution counter, using magnetic domain wall conductors which are designed to be wound in a loop-like manner and essentially to be situated in a plane and to be closed, which does not exhibit the disadvantages of the described solutions of the prior the art, or at least exhibits these to a much lesser degree, and in particular, it is to be possible to technologically manage the revolution counter, and the revolution counter should have as large a magnetic window as possible.

The invention is achieved by the characterizing features of the first claim, wherein the connecting region, in which the inner and outer loop section ends of a loop of a first magnetic domain wall conductor M1 are combined, is bridged by a second magnetic domain wall conductor M2, which is connected to the magnetic domain wall conductor ends of the spiral with a respective gap 201 therebetween, wherein the gap 201 creates a local interruption of the domain wall conductor M1 to be closed, wherein this gap 201 is provided with such a width that, during a movement of a domain wall DW of a first domain conductor section (M2 or M1), a stray field is generated therein and, in the movement direction downstream from the gap 201, results in nucleation of a domain wall DW in the subsequent domain conductor section (M2 or M1), wherein the mean width of the gap 201 is set to be less than the thickness t of the domain wall conductor M1, and the adjoining domain conductor sections (M2 or M1) are encompassed by a non-magnetic layer S1 in the gap region.

Advantageous embodiments are the subject matter of the dependent claims.

The essence of the invention is to design the magnetic conductor, in which the magnetic domain walls move, not as a continuous, uninterrupted conductor, as is customary according to the prior art, but as is shown in FIGS. 6 to 14. According to the invention, a narrow gap 201 is to be provided, in particular at the respective transitions from the domain wall conductor M1 to M2, which, for example, can be filled with non-magnetic material, as is indicated in FIGS. 9 to 11 by way of example. It was found that the interruption of the magnetic conductor surprisingly yields advantages that result in an improvement of the magnetic properties of the revolution counter compared to the previously known solutions. As was found in micromagnetic simulation calculations that were conducted, a gap 201 within the magnetic conductor which is not overly large unexpectedly does not represent an obstacle for the functionality of the sensor. FIG. 7 illustrates how the movement of a magnetic domain wall DW takes place across the gap according to the invention.

The image sequence in FIG. 7 schematically shows a top view of the magnetization distribution in M1 and M2 as a domain wall passes through the gap 201. The uppermost image shows the starting configuration. The magnetization in both regions M1 and M2 points to the left. The narrow gap 201 between M1 and M2 is encompassed by a stray field, which extends from the right conductor to the left conductor.

When a homogeneous field pointing substantially to the right acts on this arrangement including a domain wall DW in the left conductor M1, represented by the thick arrow 13 (generated by the external magnet 12 shown in FIG. 3), the domain wall DW within the left conductor M1 is moved to the right. All of the partial illustrations marked as (1) in FIG. 7 describe a movement of the domain wall in the conductor M1. Under the action of a sufficiently large magnetic field, the domain wall moves in the direction of the gap 201. There, the domain wall disappears on the right side of the left conductor (marked as (2)), which results in a change in the stray field in the gap. Together with the external field, generated by the permanent magnet 12 shown in FIG. 3 and represented by the thick arrow in FIG. 7, the changed stray field results in nucleation of a domain wall DW (marked as (3)) at the left edge of the right conductor M2. This domain wall moves further to the right in the right conductor under the influence of the field (marked as (4)).

The disappearance of the domain wall on the one hand, and the nucleation on the other hand, prevent pinning of the domain wall, as one would observe with a continuous magnetic conductor, according to the prior art described above, at a real transition between M1 and M2 having no gap.

The following exemplary embodiments are provided for a more detailed description of the invention. In the drawings:

FIG. 1 shows a top view onto a spiral, in which the inner and outer ends are connected in the plane of the spiral, the intersection K1 being shown twice, enlarged, on the right. In A1, the idealized conditions of the intersection geometry are shown. A2 shows the state that can usually be achieved by way of photolithography and that results in a larger intersecting region (diagonal $D_{exp}$);

FIG. 2 shows an illustration of the dependence of the upper and lower magnetic windows ($B_{max}(w)$ thick black curve and $B_{min}(w)$ thin black dashed curve) as a function of the width w of the domain wall conductor in which the magnetic domains move. Horizontal lines delimit the ΔB region in the case of the closed spiral having an intersection having a track width of 350 nm and a diagonal at the intersection of 525 nm;

FIG. 3 shows a top view onto the schematic illustration of a revolution counter (the contacts are not illustrated) including four closed spirals for counting 3; 5; 7 and 11 revolutions, which is capable of counting up to 1155 revolutions. A permanent magnet 12 rotating about an axis of rotation X, the stray field of which encompasses all 4 closed spirals, is present above or beneath the closed spirals;

FIGS. 1 to 5 represent the known or conceivable prior art.

Figure 7:
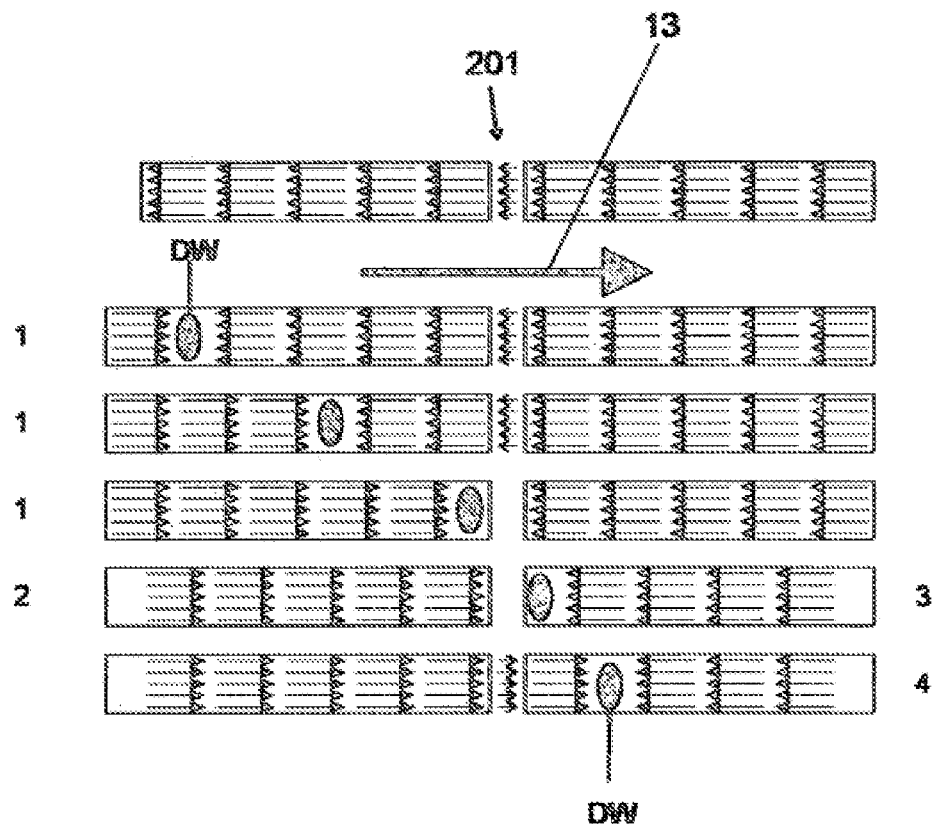
Figure 8:
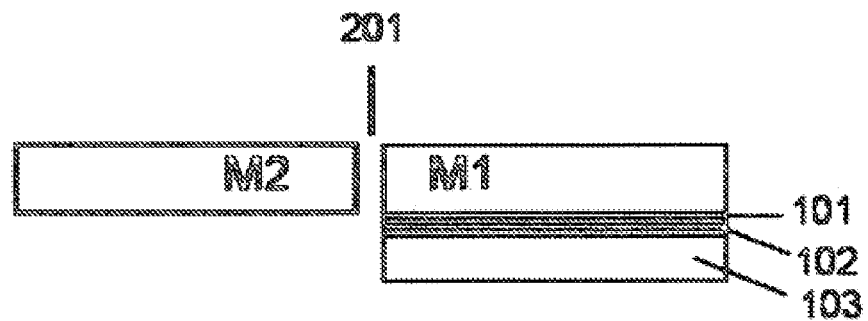
Figure 9:
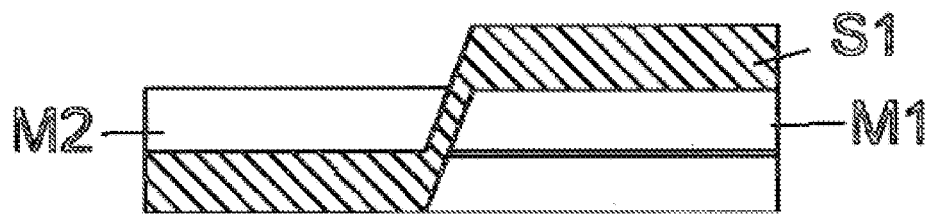
Figure 10:
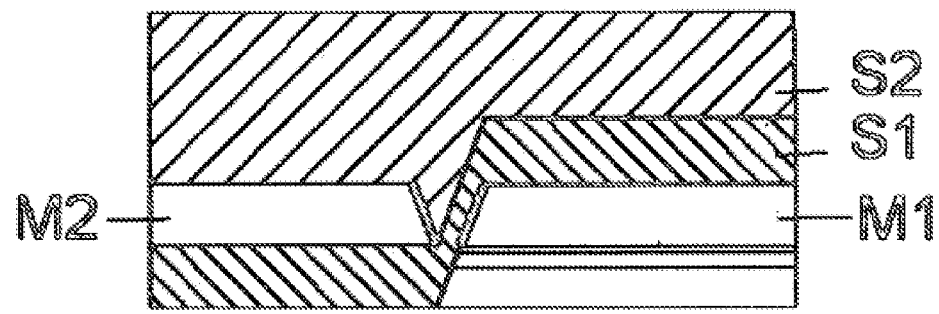

FIG. 7 shows sequences of the movement of a domain wall DW from one side of the magnetic conductor M1 across the gap 201 according to the invention to the other magnetic conductor M2. The position of the domain wall DW is schematically illustrated by a black ellipse, and the direction of the magnetization within the magnetic conductors M1 and M2 is illustrated by black arrows. The thick arrow represents the magnetic field acting on the structure due to the permanent magnet 12;

FIG. 8 shows a cross-sectional view of the connecting point M1 to M2 having the gap 201, wherein a complete XMR stack (GMR or TMR) is shown on the right, with M1 serving as the magnetic conductor, therebeneath a separating layer 101 (for example: 2 nm Cu for a GMR stack, and an approximately 1 nm insulator for a TMR stack), and therebeneath a so-called artificial antiferromagnet 102, made of CoFe/Ru/CoFe, as well as an antiferromagnet 103;

FIG. 9 shows a cross-sectional view of a design of the contact position at which the edges of the layers M1 and M2 have an oblique design and are geometrically spaced apart from one another by a separating layer S1;

FIG. 10 shows a cross-sectional view of a design of the contact position between M1 and M2, having a gap therebetween, at which the edges of the layers M1 and M2 have an oblique design, have a V-shaped design (see the slopes with thick markings), and are geometrically spaced apart from one another by a separating layer S1 and S2.

Figure 11:
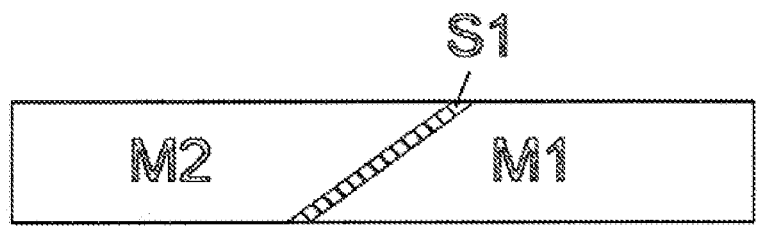
Figure 12:
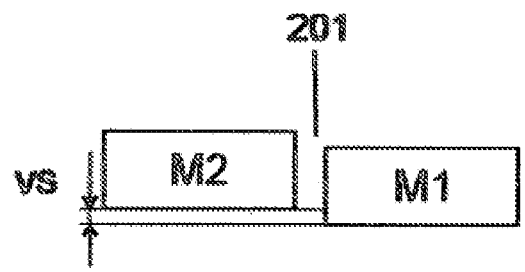
Figure 13:
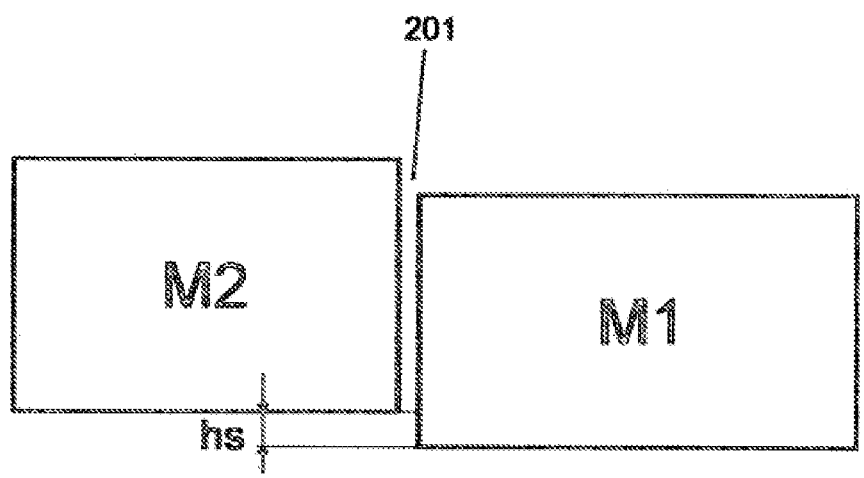
Figure 14:
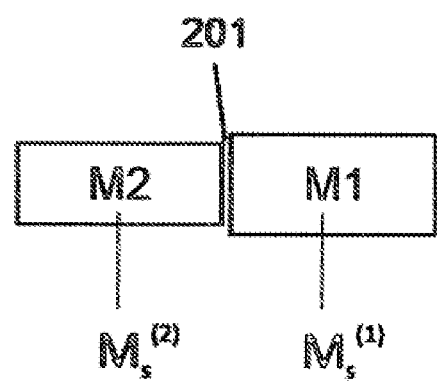

FIG. 11 shows a top view onto a design of the contact position at which the edges of the layers M1 and M2 have an oblique design and are geometrically spaced apart from one another by a separating layer S1;

FIG. 12 shows a cross-sectional view of the contact position, at which a vertical offset of the two domain wall conductors, with a size vs, is shown;

FIG. 13 shows a top view onto the connection in which a lateral, horizontal offset hs of the two domain wall conductors is shown; and FIG. 14 shows a top view onto a connection in which materials having differing saturation magnetization $M_s^{(1)}$ and $M_s^{(2)}$ are used for M1 and M2.

FIGS. 1 to 5 represent the known or conceivable prior art, which was already extensively described in the introduction, along with the associated disadvantages.

Figure 1:
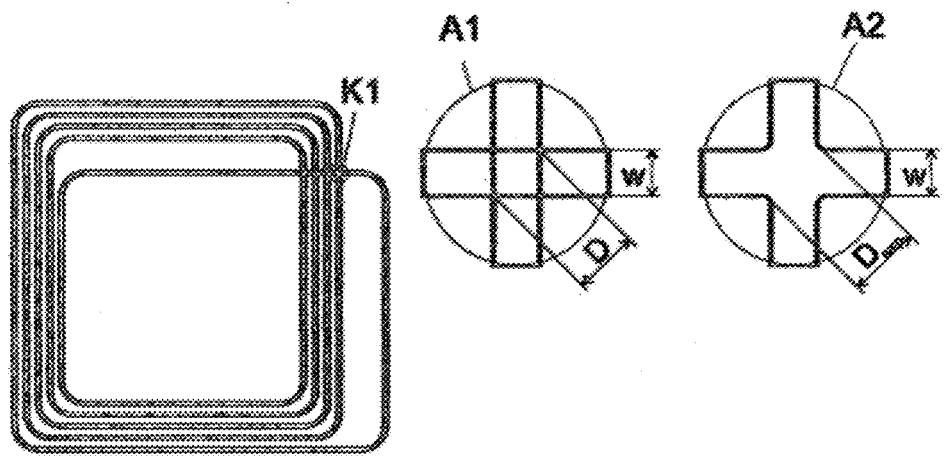
Figure 2:
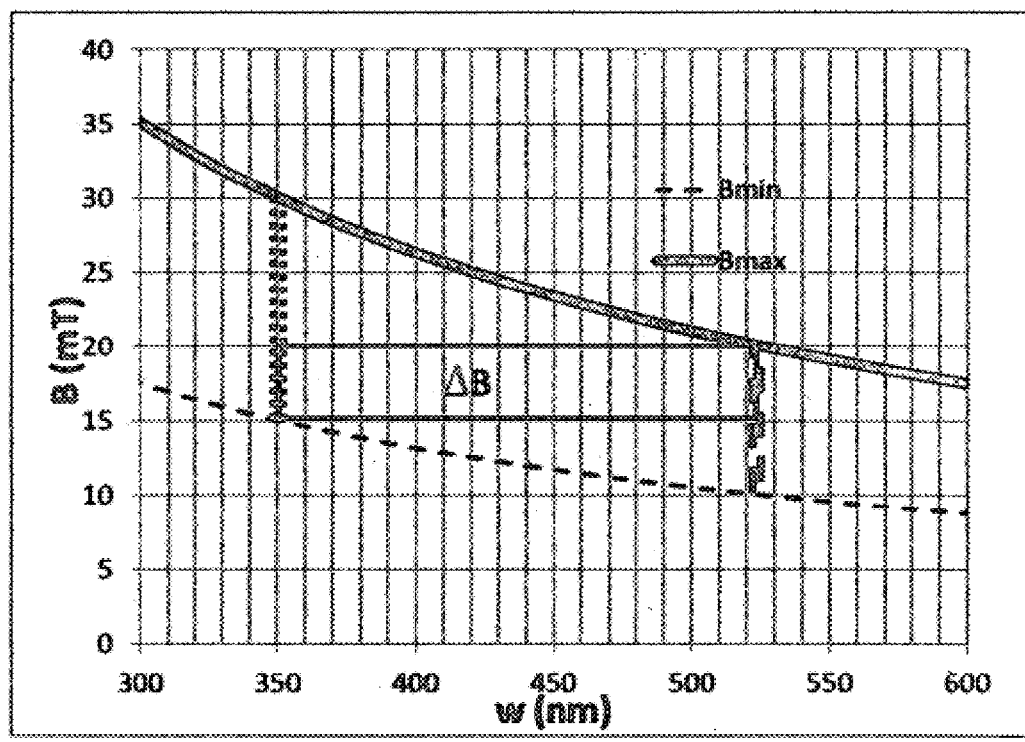
Figure 3:
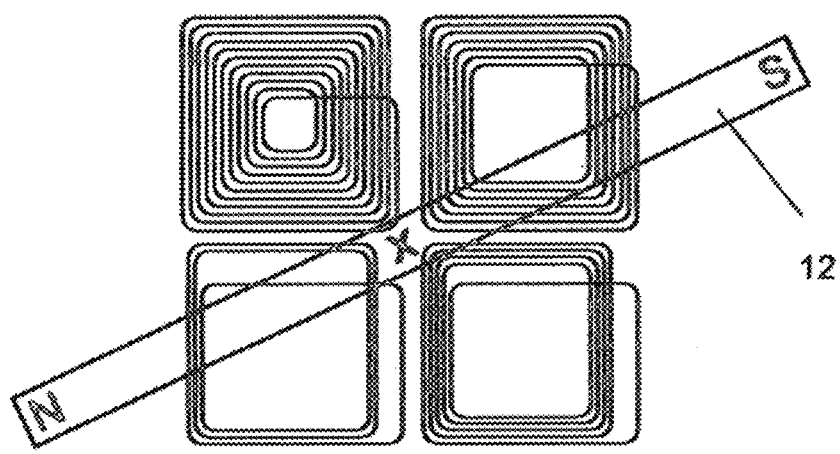
Figure 4:
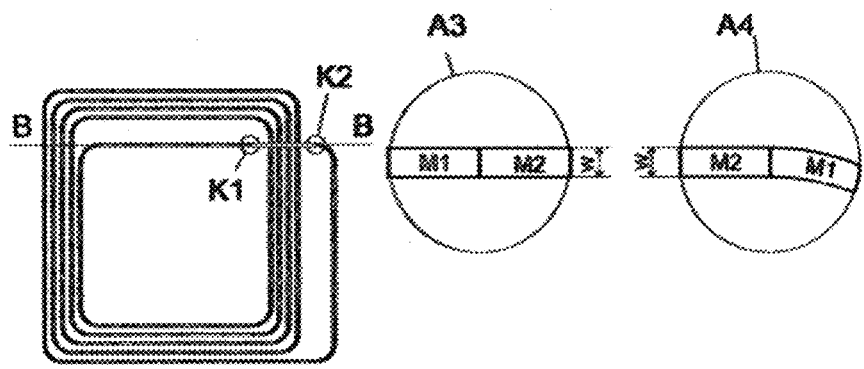
FIG. 4 shows a top view onto a spiral for counting five revolutions, which is closed by the region M2. On the right, the circular regions marked in the left image are shown in an enlarged illustration.
Figure 5:
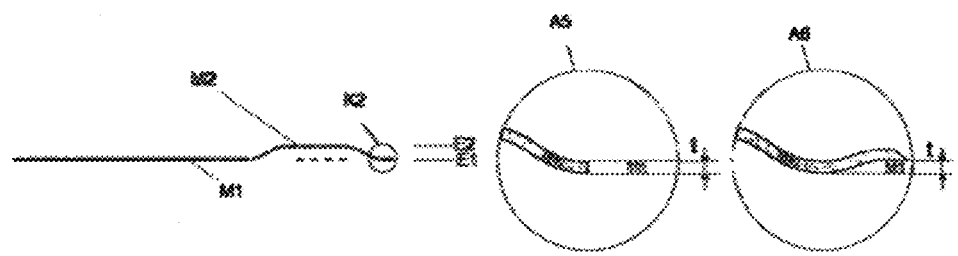
FIG. 5 shows a cross-sectional view in the B-B direction of FIG. 4. On the right, the circular region marked as K2 in the left image is shown in an enlarged illustration in two versions (A5 idealized variant and A6 overlapping variant).
Figure 6:
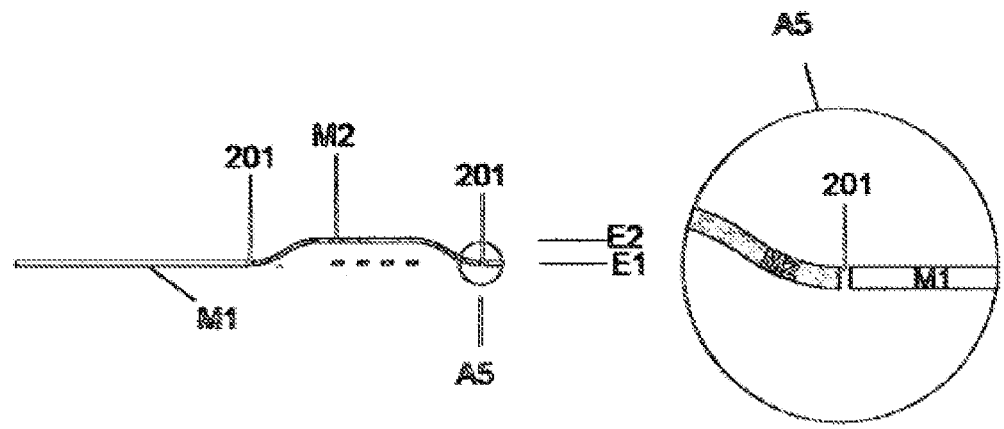
FIG. 6 shows a cross-sectional view of the domain wall conductor having a respective gap 201 according to the invention between M1 and M2, a transition between M2 and M1, having a gap therebetween, being shown in an enlarged illustration on the right in detail A5.

A detailed description of the present invention starts with FIG. 6. FIG. 6 shows a portion of the cross-section of the domain wall conductor including a respective gap 201 according to the invention, between the domain conductor sections M1 and M2. On the right, a transition between M2 and M1, including the gap 201 therebetween, is shown in an enlarged illustration in the detail A5.

FIG. 7 shows in detail how continuation of a domain wall DW takes place in the two magnetic conductor sections and across the gap 201. The position of the domain wall DW is schematically illustrated by a black ellipse, and the direction of the magnetization within the magnetic domain wall conductors M1 and M2 is illustrated by black arrows. The thick arrow represents the magnetic field acting on the structure due to the permanent magnet 12 (see FIG. 3). The detailed manner in which domain wall transport across the gap 201 according to the invention takes place was already extensively described above.

In the right portion, FIG. 8 shows a typical design, such as is used and known for a GMR or TMR stack. The layer 103 denotes an antiferromagnetic layer, for example PtMn, and the layer 102 situated thereon denotes an artificial antiferromagnetic (AAF) layer. This is a layer system that is known as an artificial antiferromagnet and typically has a composition of CoFe/0.8 nm Ru/CoFe. The layer M1 is the layer in which the magnetic domains move within the aforementioned loop. This is typically soft-magnetic and is made of $N_i$, Fe and/or Co alloys, such as $Ni_{81}Fe_{19}$, NiFeCo, NiFeB, CoFe, CoFeB, or combinations of these materials. Here, according to the present invention, it is stipulated that the layer M1 is not directly connected to the layer or the layer stack that forms M2.

FIG. 9 shows an example in which the layer M1 and the layer M2 are separated by a non-magnetic separating layer S1, which is shown as a hatched area. According to the invention, this layer is made of non-magnetic material and may be both electrically conducting, semi-conducting, and insulating. This allows great variability of technological implementation. FIG. 9 shows a contact position at which the edges of the layers M1 and M2 are designed to be oblique, but parallel to one another, and are geometrically spaced apart from one another by a separating layer S1.

As FIG. 10 shows, the lateral distance between M1 and M2 does not have to be constant within the scope of the present invention, but may also vary, as in the case of the V-shaped gap shown there. In this technical solution, the two regions are tapered in the vertical direction, provided with a minimum distance by a separation layer S1, and subsequently covered with a separation layer S2, which completely takes up the gap. For this solution also, it is the case that the two separation layers S1 and S2 are made of any non-magnetic material. Non-magnetic means that these must not have any magnetic permanent moment, which is to say these must be neither ferromagnetic nor ferrimagnetic. This means that these materials must be diamagnetic, paramagnetic, or antiferromagnetic.

The gap that is present between M1 and M2, however, may also be obliquely situated in the plane, as is shown in a top view onto the domain wall conductors by way of example in FIG. 11. Combinations of various embodiments of the gap geometry described above are likewise within the scope of the invention.

It is of great advantage for the technological implementation that the solution according to the invention allows the cross-sections of M1 and M2 not to have to transition exactly into one another, but rather these may be slightly offset, both laterally and vertically, as is indicated by way of example in FIGS. 12 and 13.

As an example, FIG. 12 shows the cross-section of a contact position where a vertical offset with a size vs is permitted. As long as the vertical offset vs is less than 25% of thickness t of the domain wall conductor M1, which is to say, at a typical thickness of the soft magnetic layer of 40 nm, is less than 10 nm, the magnetic domain wall, as is schematically illustrated in FIG. 7, is able to jump over this gap.

The same applies to a lateral offset hs of the two structures M1 and M2, as shown in FIG. 13. As long as the lateral offset hs is less than 25% of the width of the domain wall conductor, which is to say, in a typical system of 360 nm, is less than 90 nm, the magnetic domain wall can jump over the gap between M1 and M2 in a manner similar to that described above.

The described solution offers even further technological degrees of freedom, one of which is shown by way of example in FIG. 14, in which the value of the saturation magnetization of the two regions M1 and M2 differs. The reason is that the magnetic flux, which acts from M1 on M2 and from M2 on M1, is decisive for the movement of the magnetic domain wall through the gap according to the invention to function. This means that the product of the cross-section times the saturation magnetization $M_s$ should be approximately the same. For the creation of the domain wall conductor region M2, for example, a material having a value of the saturation magnetization $M_s^{(2)}$ which is approximately 40% greater than the value of the saturation magnetization $M_s^{(1)}$ may be used if the cross-section of this material is reduced by 40%. This is achieved, for example, when the domain wall conductor M1 including $Ni_{81}Fe_{19}$ having a saturation magnetization of 800 kA/m is combined with M2 made of CoFe having a saturation magnetization of 1140 kA/m. This reduction can take place either by reducing the width or the thickness by 40%, or by combining both changes, such as, for example, by reducing the width by 20%, for example, and the thickness of 20%. However, in terms of the reduction of the geometries, which are the width and thickness, symmetrical reduction is preferred over highly asymmetrical reduction.

It can be derived from the micromagnetic simulations that were carried out that the values to be expected for $B_{min}$ and $B_{max}$ are substantially unchanged as long as the mean gap width is <50% of the layer thickness t of the magnetic conductor. If the mean gap width increases notably beyond this level, a moderate increase of $B_{min}$ and a moderate decrease of $B_{max}$ are to be expected. At the maximum permitted changes in the mean gap width, based on the layer thickness t, the width of the magnetic window decreases from 15 mT to 10 mT.

The implementation of the described invention allows for a novel way of producing a closed loop, by bridging a spiral-like arrangement situated in a plane with a known structure suitable for counting revolutions, including a structure that supports the domain walls in a second plane, utilizing a geometric interruption. The present invention offers a number of previously unavailable options for the technological implementation and, when successfully implemented, results in considerable widening of the magnetic window compared to the previously known solutions according to the prior art.

While pinning of domains can already be observed with transitions, such as those that are customary according to the prior art (see, for example, DE 10 2010 022 611 B4), with even very minor steps or lithographic errors in the order of magnitude of 15 nm, which cause the revolution counter to be inoperable, a comparatively large interruption of the domain wall conductor at the site of the gap according to the invention does not have any negative influence on domain wall transport.

All features discernible from the description, the exemplary embodiments, the claims and/or the drawings can be essential to the invention to the invention, both individually and in any arbitrary combination thereamong.

LIST OF REFERENCE SIGNS

E1 plane in which the loop-like domain wall conductors are situated

E2 connecting plane
K1, K2 intersecting points
A1, A2, A3, A4, A5, A6 circles with enlarged illustrations
w width of the domain wall conductor M1
D diagonal at an intersection
$D_{exp}$ increased (realistic) value of D
X axis of rotation of the permanent magnet 12
DW domain wall
12 permanent magnet
13 arrow indicating the field direction
B-B section plane
M1 domain wall conductor of the loop-like structure
M2 second, bridging domain wall conductor
$M_s^{(1)}$, $M_s^{(2)}$ different saturation magnetizations
t thickness of the domain wall conductor M1
201 gap between M1 and M2
101 separating layer
102 artificial antiferromagnet
103 antiferromagnet
S1 non-magnetic layer
vs vertical offset between M1 and M2
hs horizontal offset between M1 and M2

The invention claimed is:

1. Revolution counter, comprising magnetic domain wall conductors which are wound each as a loop in a form of a spiral configured to be closed and are situated essentially in a plane, wherein in a connecting region inner and outer loop section ends of the loop of a first magnetic domain wall conductor are combined and bridged by a second magnetic domain wall conductor which is connected to the inner and outer loop section ends of the loop of the first magnetic domain wall conductor with a gap therebetween, the gap creating a local interruption of the first magnetic domain wall conductor, the gap being provided with such a width that, during a movement of a domain wall of a first domain conductor section of either the first or the second magnetic domain wall conductor, a stray field is generated therein and, in a direction the movement, downstream from the gap, results in nucleation of a domain wall in a subsequent domain conductor section, a mean width of the gap being set to be less than a thickness of the magnetic domain wall conductors and adjoining domain conductor sections of the first and second magnetic domain wall conductors being encompassed by a non- magnetic layer in a region of the gap.

2. The revolution counter according to claim 1, wherein the first and second magnetic domain wall conductors are horizontally or vertically offset with respect to one another by less than 25% of the thickness or a width of the first magnetic domain wall conductor.

3. The revolution counter according to claim 1, wherein end faces of the first and second magnetic domain wall conductors forming the gap are disposed parallel to one another or obliquely in an angular range of 25° to 90°.

4. The revolution counter according to claim 2, wherein end faces of the first and second magnetic domain wall conductors forming the gap are disposed parallel to one another or obliquely in an angular range of 25° to 90°.

5. The revolution counter according to claim 1, wherein the first and second magnetic domain wall conductors are each comprised of a soft magnetic material having a saturation magnetization differing from the saturation magnetization of the other domain wall conductor by less than 40%.

6. The revolution counter according to claim 1, wherein the product (cross-section · saturation magnetization) of respective regions of the first and second magnetic domain wall conductors comprised of the respective soft magnetic materials differ by <25%.

7. The revolution counter according to claim 1, wherein the non-magnetic layer is made of a diamagnetic, paramagnetic, or antiferromagnetic material.

8. The revolution counter according to claim 1, wherein respective regions of the first and second magnetic domain wall conductors are comprised of respective soft magnetic materials differing in saturation magnetization and the product (cross-section · saturation magnetization) of the respective regions of the first and second magnetic domain wall conductors differ by <25%.

* * * * *